United States Patent [19]

Takahashi et al.

[11] Patent Number: 5,901,320
[45] Date of Patent: May 4, 1999

[54] COMMUNICATION SYSTEM CONFIGURED TO ENHANCE SYSTEM RELIABILITY USING SPECIAL PROGRAM VERSION MANAGEMENT

[75] Inventors: Souichi Takahashi, Kanazawa; Seiichi Kobayashi, Kawasaki, both of Japan

[73] Assignee: Fujitsu Limited, Kanagawa, Japan

[21] Appl. No.: 08/854,916

[22] Filed: May 13, 1997

[30] Foreign Application Priority Data

Nov. 29, 1996 [JP] Japan ..................................... 8-319775

[51] Int. Cl.⁶ .............................. G06F 9/445; G06F 11/00
[52] U.S. Cl. .................... 395/712; 395/701; 395/200.53; 395/182.19
[58] Field of Search .................................... 395/712, 701, 395/500, 200.52, 200.53, 182.08, 182.19, 200.68; 364/228.5, 230, 230.4

[56] References Cited

U.S. PATENT DOCUMENTS

| | | | |
|---|---|---|---|
| 4,788,637 | 11/1988 | Tamaru | 395/200.51 |
| 5,008,814 | 4/1991 | Mathur | 395/200.51 |
| 5,530,949 | 6/1996 | Koda et al. | 395/182.08 |
| 5,598,530 | 1/1997 | Nagae | 395/182.19 |
| 5,630,139 | 5/1997 | Ozaki | 395/712 |
| 5,737,585 | 4/1998 | Kaneshima | 395/500 |

FOREIGN PATENT DOCUMENTS

| | | |
|---|---|---|
| 1-171025 | 7/1989 | Japan . |
| 2-236761 | 9/1990 | Japan . |
| 6-4295 | 1/1994 | Japan . |

*Primary Examiner*—Tariq R. Hafiz
*Assistant Examiner*—Antony Nguyen-Ba
*Attorney, Agent, or Firm*—Helfgott & Karas, P.C.

[57] ABSTRACT

A communication system comprising a plurality of network elements and a monitoring apparatus for centrally monitoring and controlling these network elements. Each of the network elements has a plurality of CPU's and a flash memory for accommodating programs to be performed by the CPU's. The monitoring apparatus includes a database, a management unit and a transfer unit. The database retains a plurality of programs for each of the CPU's in each network element, and generic issues defined uniquely corresponding to combinations of versions of programs to be executed by each CPU. When the version of any program is changed, the management unit selects the program to be transferred in accordance with the applicable generic issue. The transfer unit transfers the program thus selected to the monitoring apparatus.

20 Claims, 10 Drawing Sheets

FIG. 3

Generic issue:60A09-01-2

| CPU NAME | cpuissue |
|---|---|
| SV-M | : S6M09-01-2 |
| SV-HL | : S6H09-01-1 |
| SV-LL | : S6L09-01-1 |
| MP-M | : M6M09-01-1 |
| MP-D | : M6D09-01-1 |
| EC | : E6A09-01-1 |

FIG. 4

CONFIGFILE: 60A09012.CON

```
GISSUE   09-01-2
TARGET-NE 60A
/*FILENAME   CPUISSUE      FILESIZE   SIGNATURE1   SIGNATURE2 */
S6M09012.PGM  S6M09-01-2   335284     E5CF3864     DD59E5F3
S6H09011.PGM  S6H09-01-1   329158     5C4EE337C    F4500AAC
S6L09011.PGM  S6L09-01-1   160990     D37E443E     221CD77E
M6M09011.PGM  M6M09-01-1   96720      2D529903     23EEF05E
M6D09011.PGM  M6D09-01-1   62753      2BDD8C33     AC350CFF
E6A09011.PGM  E6A09-01-1   82508      06D22288     ED6298B2
```

COMMUNICATION SYSTEM CONFIGURED TO ENHANCE SYSTEM RELIABILITY USING SPECIAL PROGRAM VERSION MANAGEMENT

BACKGROUND OF THE INVENTION

1. Field of the Invention

The present invention relates to a communication system comprising a plurality of network elements and a monitoring apparatus for centrally monitoring and controlling these network elements. More particularly, the invention relates to techniques for performing file management and deterioration check in connection with the process of downloading software using an application entity (layer 7) of the OSI (Open System Interconnection).

2. Description of the Related Art

In a growing number of cases, network elements constituting a communication system are functionally updated today through software (program) updates. Software updates are easier to carry out than updates through hardware replacement in terms of debugging, functional reinforcement and expansion. But the ease of the software update scheme can result in its undoing. The easy-to-make updates may disable the entire communication system if not carried out correctly and scrupulously. To update successfully the software controlling the network elements requires adopting verification procedures demanding a lot of care and attention.

In a majority of communication systems comprising network elements such as optical terminal transmission devices interconnected via communication lines, the programs (firmware) for a plurality of CPU's (central processing units) are updated by maintenance personnel manually replacing ROM's (read only memories). Program versions are managed primarily through a ledger-based ROM version management scheme. From the time programs are stored into ROM's until the ROM contents are updated in the network elements, the programs in the ROM's are not electronically checked for validity.

As a result, it has happened that some of the programs in the ROM's having been destroyed or deteriorated were updated heedlessly and caused the network elements to malfunction. In other cases, the communication system was disrupted when ROM sockets were incorrectly reconnected. Furthermore, ROM replacement work has turned out to be a tedious and troublesome task.

To circumvent such disadvantages, a monitoring apparatus is connected via control lines to the network elements so that the latter are under centralized surveillance and control within the communication system. The programs executed by the CPU's in the network elements are transferred as download data from the monitoring apparatus to the network elements. The programs downloaded to the network elements are subject to CPU-wise program version management by the monitoring apparatus. The validity of the download data is ascertained by checking to see if the download data yet to be transferred coincides with the transferred download data. The checks are performed on the basis of the communication protocols established between the monitoring apparatus and the network elements.

In other words, the conventional version management of the programs transferred to the network elements involves having the monitoring apparatus check the versions of the programs for each of the CPU's. Such a management scheme is complicated and runs the risk of inadvertently transferring a combination of programs that are not functionally compatible. Checking the validity of the transferred download data simply involves confirming the coincidence between the yet-to-be transferred and the transferred download data. If any invalid program is inadvertently or maliciously transferred, the fault cannot be detected by the conventional scheme. Furthermore, there is a possibility that during or after the transfer of program files, part of the programs may be destroyed or degraded due to memory trouble or other hardware-related causes. Any of such contingencies can cripple the network elements and reduce the reliability of the communication system as a whole.

SUMMARY OF THE INVENTION

It is therefore an object of the present invention to provide a communication system for facilitating the version management of programs transferred from a monitoring apparatus to network elements so that functionally incompatible programs are not transferred in combination to the latter.

It is another object of the invention to provide a communication system for preventing its monitoring apparatus from transferring invalid programs to any of the network elements incorporated.

It is a further object of the invention to provide a communication system offering enhanced levels of reliability.

In carrying out the invention and according to one aspect thereof, there is provided a communication system comprising a plurality of network elements and a monitoring apparatus connected to the network elements via communication lines for centralized monitoring and control of the network elements; wherein each of the network elements includes a plurality of central processing units, and first storage means for storing programs to be executed by the central processing units; and wherein the monitoring apparatus includes: second storage means for storing a plurality of programs as files for each of the central processing units; third storage means for storing generic issues representing versions of the programs for the central processing units in each of the network elements, the versions being called CPU issues, the generic issues being uniquely defined corresponding to combinations of the CPU issues; management means for selecting programs to be transferred to the network elements on the basis of the generic issues stored in the third storage means when the versions of the programs for the central processing units in each of the network elements are changed; and first transfer means for retrieving from the second storage means the program files selected by the management means, generating download data in which the program files are set, and transferring the download data to each of the network elements.

The communication system of the constitution outlined above utilizes generic issues in managing the versions of programs to be executed by each of the central processing units in each of the network elements. The scheme facilitates version management of each program and thereby prevents functionally incompatible programs from getting transferred to any of the network elements.

In a preferred structure of the communication system according to the invention, the third storage means may store configuration files corresponding to the network elements on a one-to-one basis; wherein the generic issues and the CPU issues corresponding to these generic issues may be included as data in the configuration files; and wherein the configuration files may further include file names of the program files corresponding to the CPU issues, sizes of the program files, and first checksum values which are theoretical checksum values of the program files. The first transfer means may also transfer the configuration files to the network elements.

In another preferred structure of the communication system according to the invention, each of the network elements may comprise check means for acquiring second checksum values by calculating the checksum values of the transferred program files, comparing the second checksum values with the first checksum values set in the transfer commands, and detecting an error if a mismatch results from the comparison. In addition, the monitoring apparatus may include fourth storage means for storing theoretical third checksum values regarding the configuration files, and the first transfer means may also transfer the third checksum values to each of the network elements. Furthermore, the check means acquires fourth checksum values by calculating the checksum values of the transferred configuration files, compares the fourth checksum values with the third checksum values set in the transfer commands, and detects an error if a mismatch results from the comparison.

The communication system of the above structures causes the monitoring apparatus to transfer not only the program files but also the configuration file to each of the network elements. The transferred configuration files make it possible to ascertain whether the transferred programs are valid, whereby the transfer of any invalid programs from the monitoring apparatus to any of the network elements is prevented.

Destruction or degradation of any file contents that may have occurred during or after the transfer of the program or configuration files is verified by comparing theoretical checksum values with the checksum values calculated after the transfer. The scheme permits constant checks on the program and configuration files for validity.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a list of typical generic issue definitions for use with the embodiment;

FIG. 4 is a list of typical configuration file names for use with the embodiment;

DESCRIPTION OF THE PREFERRED EMBODIMENTS

Figure 1:
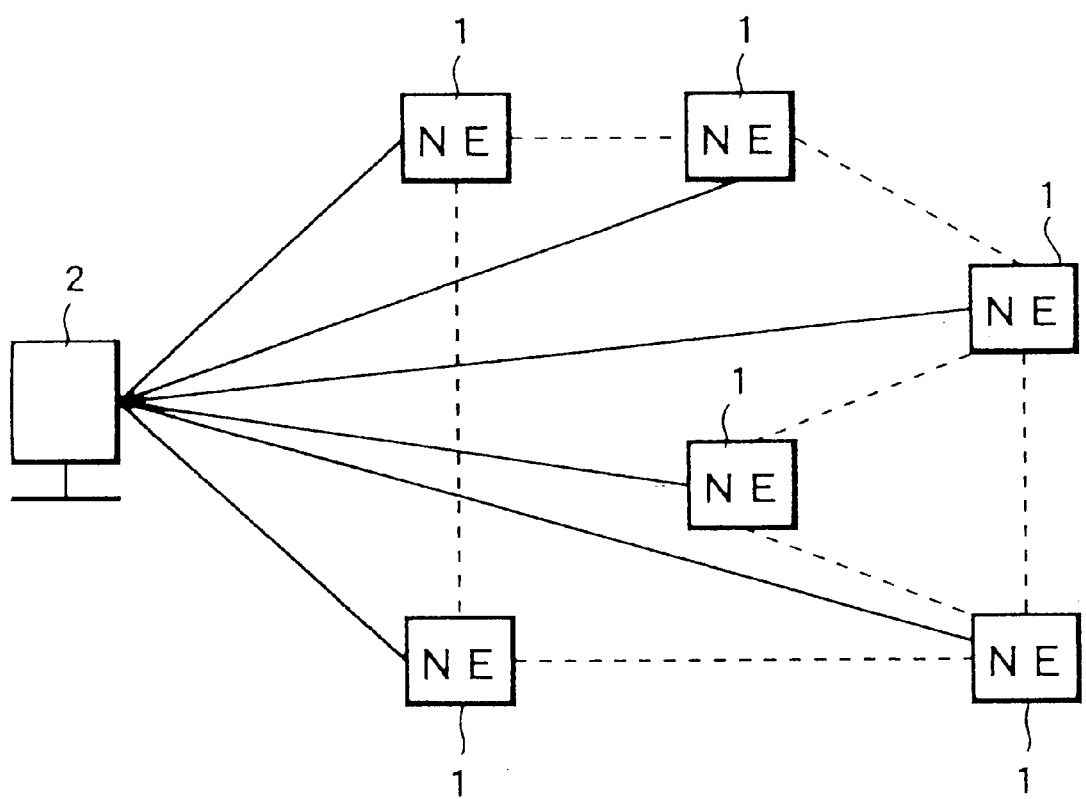
FIG. 1 is a schematic view showing an overall constitution of a communication system practiced as an embodiment of the invention.

A preferred embodiment of the invention will now be described with reference to the accompanying drawings. FIG. 1 is a schematic view showing an overall constitution of a communication system practiced as one embodiment of the invention. This embodiment may be a communication system such as an electronic switching system or a mobile communication system. The system illustratively comprises a plurality of network elements (NE's) 1 such as optical multiplex transmitters and a monitoring apparatus (monitoring and control intelligence) 2 for centrally monitoring and controlling these network elements 1. The network elements 1 are interconnected via communication lines, and the network elements 1 and the monitoring apparatus 2 are connected by means of control lines.

Figure 2:
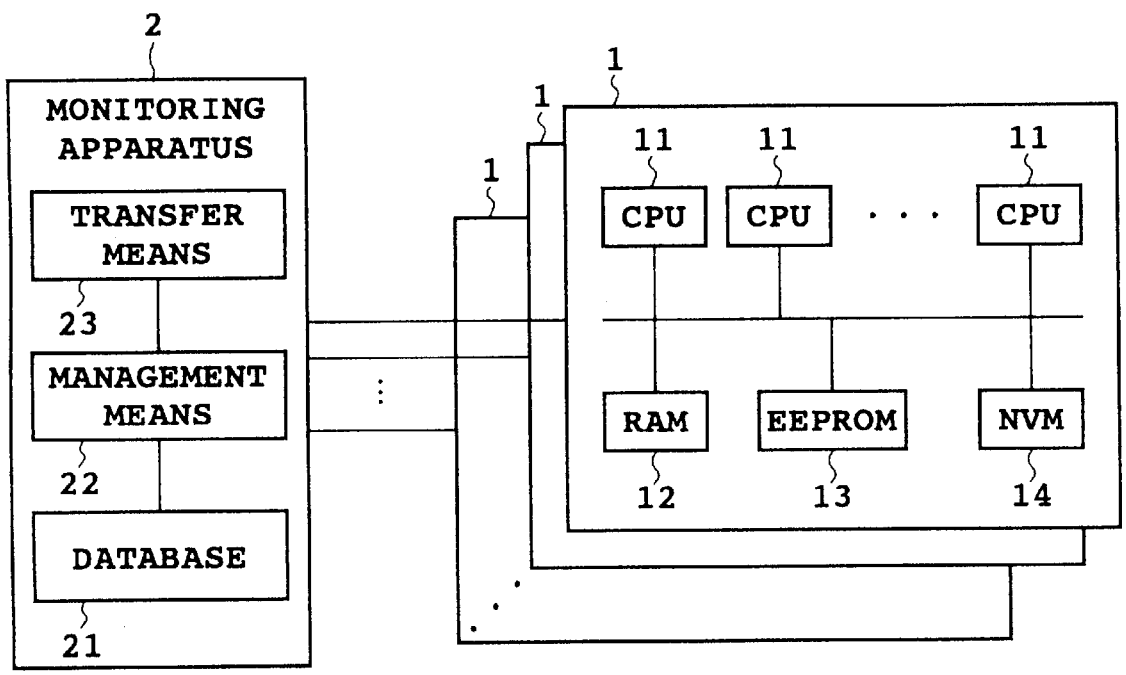
FIG. 2 is a schematic view showing major components of the invention.

As shown in FIG. 2, each network element 1 has a plurality of CPU's (central processing units) 11, a RAM (random access memory) 12, an EEPROM (electrically erasable programmable read-only memory) 13 and a flash memory (NVM: non-volatile memory) 14. The monitoring apparatus 2 includes a database 21, management means 22 and transfer means 23. The database 21 stores in advance a plurality of program files for each of the CPU's 11 in each network element 1 (the database may include program files of different versions to be executed by the same CPU).

The versions of the program files for the CPU's 11 in each network element 1 are called a CPU issue each. The combination of the CPU issues for each network element is matched uniquely with a specifically defined generic issue. For example, suppose that, as shown in FIG. 3, a network element 1 has six CPU's 11 named SV-M, SV-HL, SV-LL, MP-M, MP-D and EC and that these CPU's 11 have CPU issues S6M09-01-2, S6H09-01-1, S6L09-01-1, M6M09-01-1, M6D09-01-1 and E6A09-01-1 assigned thereto. In this example, the generic issue may illustratively be defined as 60A09-01-2.

With this embodiment, each generic issue is defined in the form of "AAAXX-YY-Z," where "AAA" stands for the type of the network element 1 in question and "XX-YY-Z" denotes the corresponding version. Each CPU issue is defined in the form of "BBBXX-YY-Z," where "BBB" represents the type of the CPU 11 in question and "XX-YY-Z" identifies the version of the applicable program.

Even a single different CPU issue in any generic issue requires defining another generic issue covering the dissimilar CPU issue. Each combination of CPU issues defined as a generic issue is deemed to guarantee that the corresponding programs function properly in the network element. The generic issue thus defined is set as one data item in a configuration file. One configuration file is provided for each network element and is stored in advance in the corresponding database 21.

A configuration file is illustratively structured as shown in FIG. 4. In the typical configuration file of FIG. 4, the generic issue is made up of a version name (GISSUE) and the corresponding network element name (TARGET-NE). The single generic issue is matched with a plurality of CPU issues (CPUISSUE).

Each CPU issue corresponds to a program file name (FILENAME), a program file size (FILESIZE) and theoretical program file checksum values (SIGNATURE1, SIGNATURE2). SIGNATURE1 represents a theoretical checksum value in effect after compression of the program file, and SIGNATURE2 denotes a theoretical checksum value in effect before the compression (i.e., after decompression of the program file). The name of the configuration file (CONFIGFILE) is "60A09012.CON." These checksum values are calculated and validated in advance by the minimal polynomial method of CRC32 (cyclic redundancy check in 32 bits) which is a transmission error detection method based on the CCITT recommendations.

Figure 5:
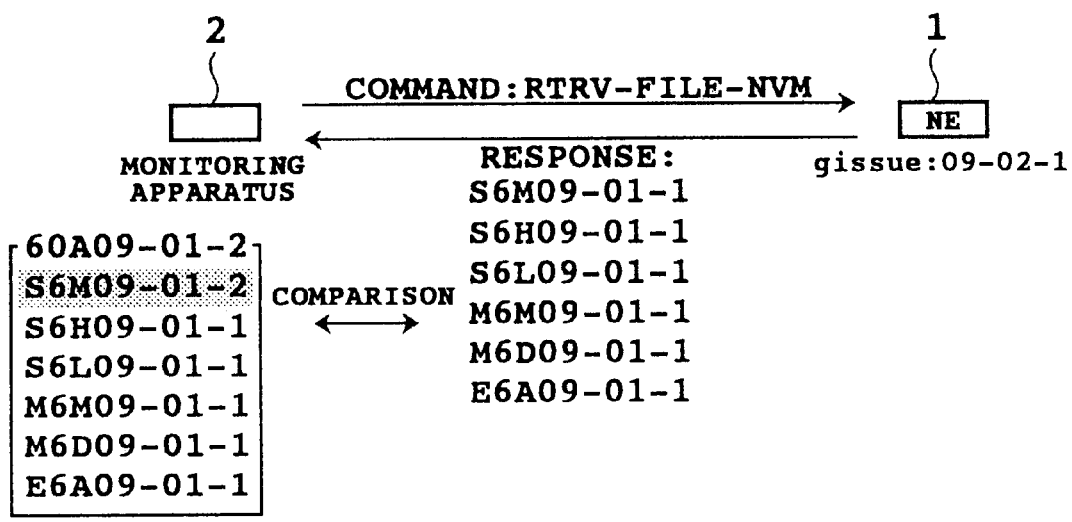
FIG. 5 is a schematic view depicting how management means of the embodiment performs its processing.

When the version of a program being executed currently is to be changed to a new version of the program to be executed by a CPU 11 next is changed, the management means 22 selects the program to be transferred to the network element 1 in accordance with the generic issue in the corresponding configuration file held in the database 21. How the program to be transferred is selected will now be described with reference to FIG. 5.

The management means 22 first issues a command (e.g., RTRV-FILE-NVM) prompting the network element 1 to transfer the CPU issues of the programs being executed by the CPU's 11. In response, the network element 1 returns the CPU issues of the currently executing programs to the management means 22. The returned CPU issues are compared with the CPU issues in that configuration file of the network element to which a change of the program version has been made. Upon comparison, the changed program file is selected as the program to be transferred to the network element 1. Specifically, the CPU issue "S6M09-01-1" regarding the SV-M is assumed to be changed to "S6M09-01-2" in the above example. In that case, the program file "S6M09012.PGM" applicable to "S6M09-01-2" is selected.

Figure 6:
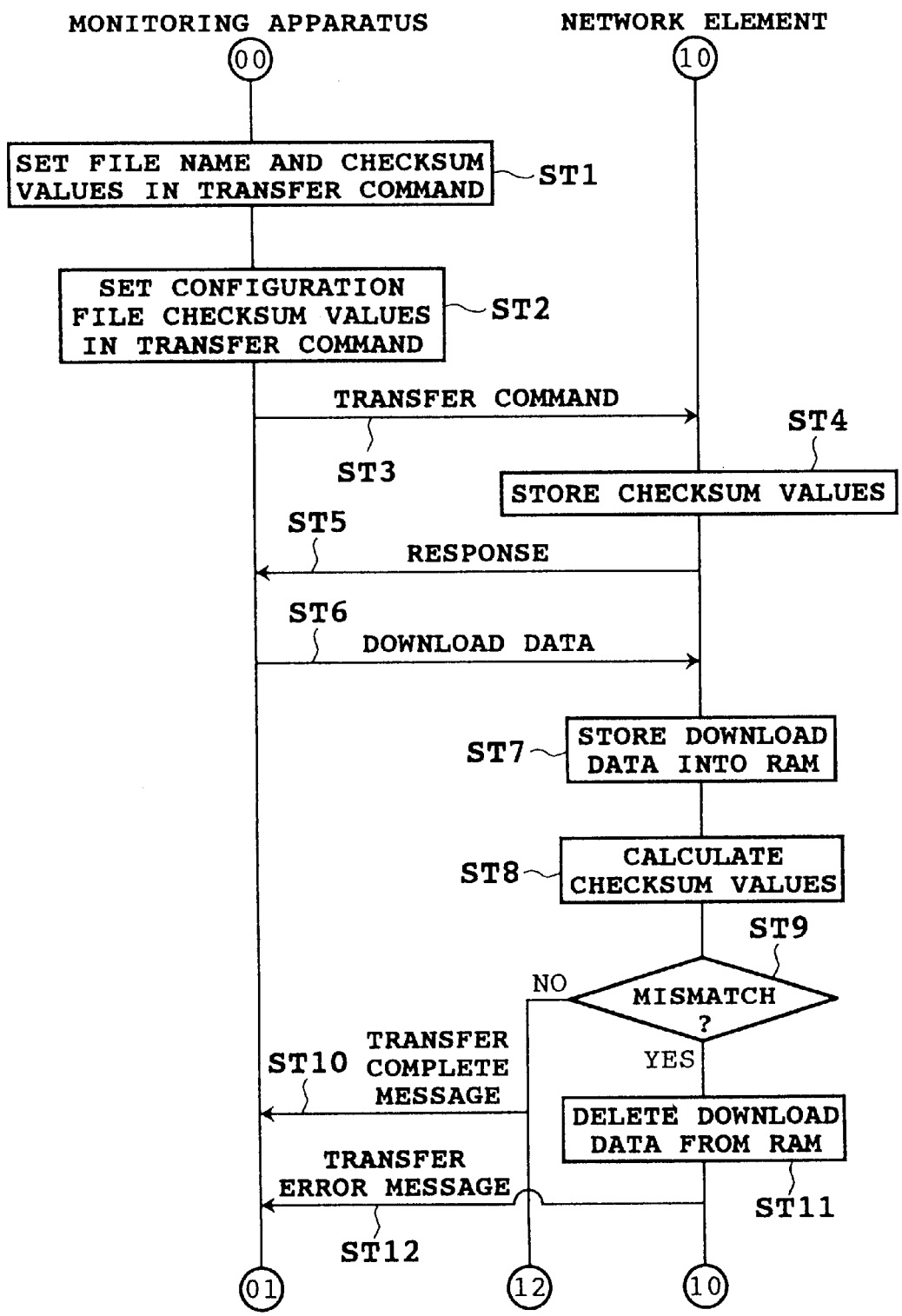
FIG. 6 is a flowchart of steps in which download data is transferred by the embodiment.

FIG. 6 is a flowchart of steps in which download data is transferred by the embodiment. In step 1 (ST1 in FIG. 6), the transfer means 23 extracts the name of the program file selected by the management means 22 and the applicable checksum values in effect before and after compression (the checksum values are hereunder called the first theoretical checksum values for distinction from the other checksum values) from the configuration file. The file name and the checksum values are then set as parameters in a transfer command for ordering the network element 1 to start transferring download data. With this embodiment, the program file name "S6M09012.PGM" in the configuration file "60A09012.CON" and the corresponding first checksum values "E5CF3864, DD59E5F3" are set in the transfer command.

In step 2, the transfer means 23 sets in this transfer command checksum values of the configuration file held in the database 21 (the checksum values are hereunder called the second theoretical checksum values for distinction from the other checksum values). In step 3, the transfer means 23 sends the transfer command, set with the first and the second theoretical checksum values, to the network element 1 in question. In step 4, the network element 1 receives the transfer command and stores the first and the second theoretical checksum values in the RAM 12. In step 5, the network element 1 23 sends to the monitoring apparatus 2 a response indicating the completion of transfer preparations.

In step 6, the transfer means 23 retrieves from the database 21 the program file selected by the management means 22 as well as the configuration file in which the program file version has been changed, generates download data in which the program file and the configuration file are set, and transfers the download data to the network element 1. Where necessary, the download data may be compressed in accordance with predetermined compression rules before the transfer. For data compression, Kermit Software (developed by Columbia University, U.S.A.) may illustratively be used.

In step 7, the download data transferred by the transfer means 23 is stored consecutively into the RAM (e.g., RAM disk) 12 in the network element 1. In step 8, the network element 1 utilizes the above-mentioned CRC32 method to calculate the checksum values of the program file set in the download data held in the RAM 12 (the calculated checksum values are hereunder called the first calculated checksum values for distinction from the other checksum values). The network element 1 also uses the CRC32 method to calculate the checksum values of the configuration file set in the download data retained in the RAM 12 (the calculated checksum values are hereunder called the second calculated checksum values for distinction from the other checksum values)

In step 9, the first theoretical checksum values are compared with the first calculated checksum values and the second theoretical checksum values are compared with the second calculated checksum values. If the two comparisons result in a match in step 9, the network element 1 sends a transfer complete message to the monitoring apparatus 2 in step 10. If at least one of the comparisons in step 9 results in a mismatch, the network element 1 deletes the received download data from the RAM 12 in step 11. In step 12, the network element 1 sends a transfer error message to the monitoring apparatus 2.

Figure 7:
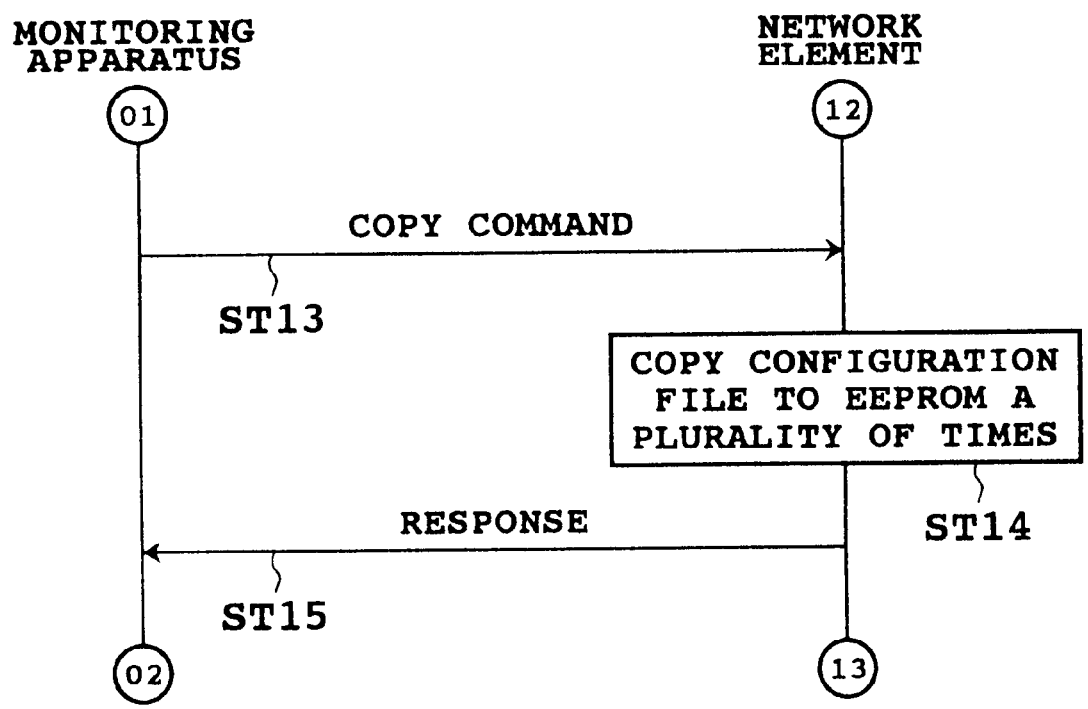
FIG. 7 is a flowchart of steps in which a configuration file, is copied by the embodiment.

FIG. 7 is a flowchart of steps in which a configuration file is copied by the embodiment. After the monitoring apparatus 2 has received the transfer complete message from the network element 1 in step 10 of FIG. 6, step 13 of FIG. 7 is reached. In step 13, the monitoring apparatus 2 sends to the network element 1 a first copy command ordering the latter to copy the configuration file from the RAM 12 to the EEPROM 13. The EEPROM 13 has a plurality of backup areas capable of accommodating a plurality of configuration files. In step 14, the network element 1 copies the configuration file held in the RAM 12 to different backup areas in the EEPROM 13 a plurality of number of times. With the copy operation completed, the network element 1 returns to the monitoring apparatus 2 a response indicating the completion of the copying in step 15. With this embodiment, it is assumed that the EEPROM 13 has backup areas for accommodating up to 50 configuration files and that a configuration file may be copied up to 50 times.

Figure 8:
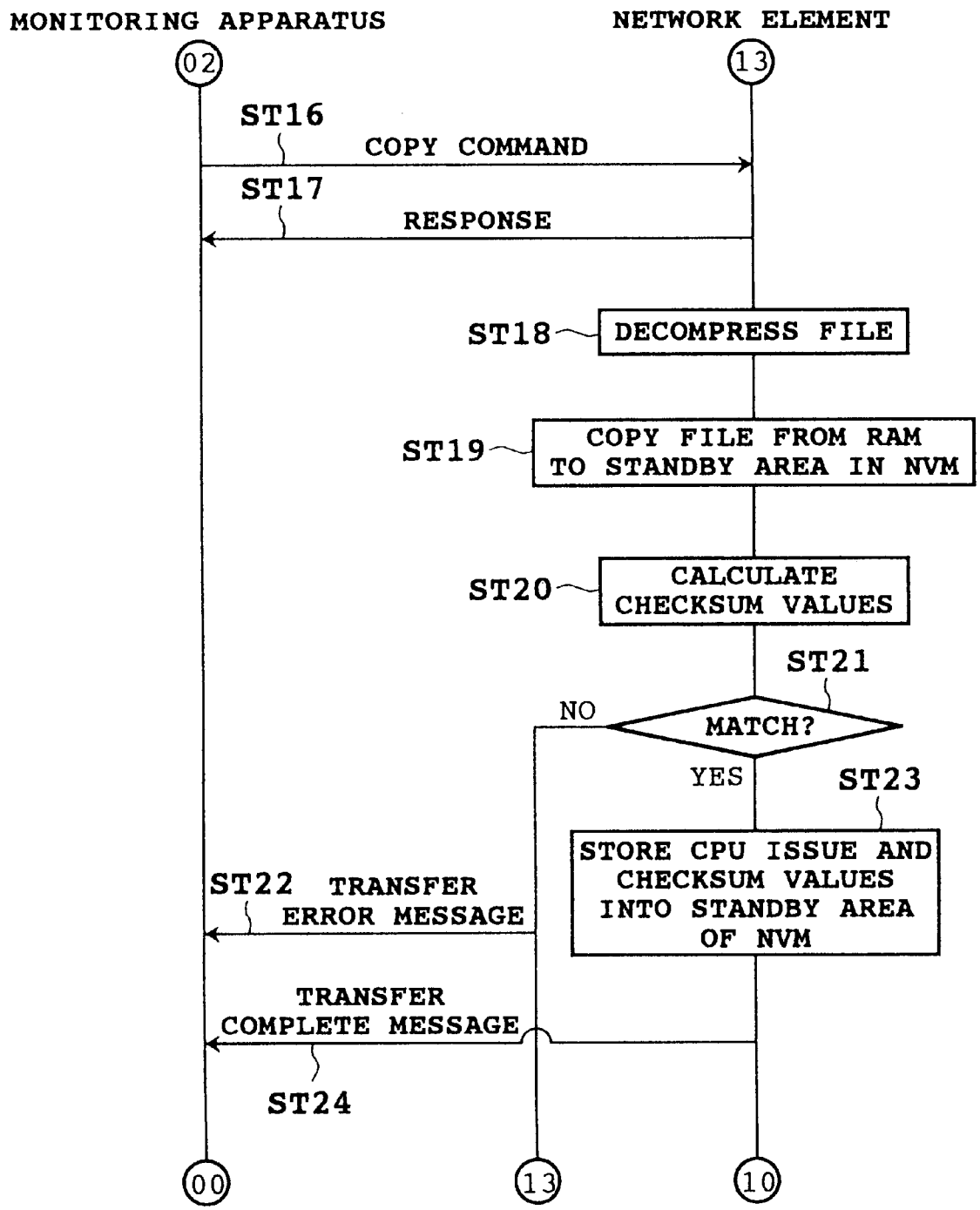
FIG. 8 is a flowchart of steps in which a program file is copied by the embodiment.

FIG. 8 is a flowchart of steps in which a program file is copied by the embodiment. After the monitoring apparatus 2 has received the response from the network element 1 in step 15 of FIG. 7, step 16 of FIG. 8 is reached. In step 16, the monitoring apparatus 2 sends to the network element 1 a second copy command ordering the latter to copy the program file from the RAM 12 to the NVM 14. In receipt of the second copy command, the network element 1 returns a response to the monitoring apparatus 2 in step 17. If the program file set in the download data in the RAM 12 is in a compressed state, the network element 1 decompresses the program file in step 18. In step 19, the network element 1 copies the decompressed program file to a standby area in the NVM 14.

In step 20, the network element 1 uses the above-mentioned CRC32 method to calculate the checksum values of the program file copied to the NVM 14 (the calculated checksum values are hereunder called the third checksum values for distinction from the other checksum values). In step 21, the third calculated checksum values are compared with the checksum values corresponding to the program file in the configuration file held in the EEPROM 13 (the latter checksum values are hereunder called the third theoretical checksum values for distinction from the other checksum values). If the comparison results in a mismatch, the network element 1 sends a transfer error message to the monitoring apparatus 2 in step 22.

If the third calculated checksum values match the third theoretical checksum values in step 21, the corresponding CPU issue and checksum values (the same as the third calculated checksum values) are placed into a file control block (FCB) in the standby area of the NVM 14 in step 23. In step 24, the network element 1 sends a transfer complete message to the monitoring apparatus 2. The third theoretical checksum values which are set in the configuration file held in the EEPROM 13 and which are compared with the third calculated checksum values in step 21 need to be validated as follows:

Of a plurality of configuration files (up to 50 for this embodiment) held in the EEPROM 13, a few (e.g., 3 files) are randomly selected and compared with one another. If a majority of the selected configuration files (e.g., 2 files out of 3) match in contents, the contents of the matched configuration files are regarded as valid. Then the checksum values set in the validated configuration files are used as the third theoretical checksum values.

If there are configuration files other than the validated configuration files, the validated file contents are overwritten to those backup areas in the EEPROM 13 which retain the invalid configuration files. If all selected configuration files (e.g., 3) are found to differ from one another in contents, an error is recognized and another copy operation is carried out from the RAM 12 to the EEPROM 13. In this manner, if something caused destruction of a configuration file(s) in the backup areas of the EEPROM 13, the correct configuration file contents can still be determined with a probability of as high as 95 percent. Where part of the configuration file contents were degraded, repairs of the faulty part can still be done to improve the reliability of checksum values.

Figure 9:
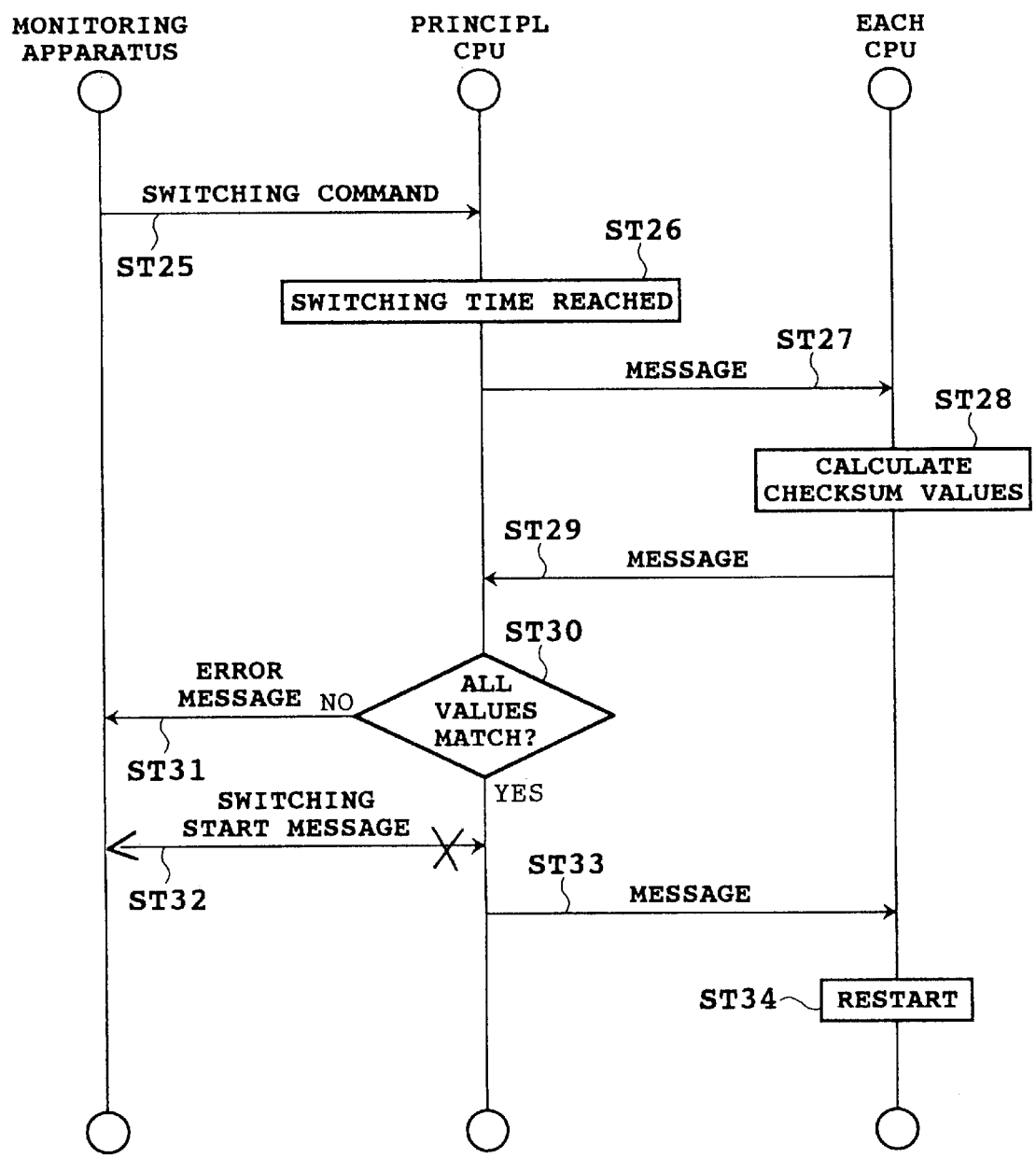
FIG. 9 is a flowchart of steps in which an active area and a standby area in storage are switched by the embodiment.

FIG. 9 is a flowchart of steps constituting a version switching sequence of the embodiment. In step 25, the monitoring apparatus 2 sends to the network element 1 an initialize system command ordering the latter to switch between an active area and a standby area in the NVM 14. The initialize system command is set with a time at which to switch between the active and the standby area (i.e., switching time). Of the CPU's 11 in the network element 1, the principal CPU (e.g., SV-M) 11 receives the command, verifies the switching time set in the command, and sets a starting timer accordingly. When the switching time (e.g., 12:00:00, May 1, 1995) is reached in step 26, the principal CPU 11 supplies the configured CPU's (including the principal CPU) with a start system message in step 27.

Given the start system message in step 27, each CPU 11 reaches step 28 and uses the above-mentioned CRC32 method to calculate the checksum values of the program file held in he NVM 14 for the CPU 11 in question (the calculated checksum values are hereunder called the fourth calculated checksum values for distinction from the other checksum values). In step 29, the CPU 11 sets in a message (e.g., REPT-VERS) the fourth calculated checksum values and the CPU issue held in the FCB of the standby area of the NVM 14, and returns the message to the principal CPU 11.

In step 30, the principal CPU 11 compares the fourth calculated checksum values received from each CPU 11 with the checksum values regarding the corresponding CPU issue set in the configuration file held in the FCB of the backup area in the EEPROM 13 (the checksum values are hereunder called the fourth theoretical checksum values for distinction from the other checksum values). If any one of the values fails to match, the switching is not carried out and the principal CPU 1 sends an error message to the monitoring apparatus 2 in step 31.

If all checksum values match, the principal CPU 11 sends a switching start message to the monitoring apparatus 2 in step 32 in order to switch between the active and the standby area. With this embodiment, the version of the program file for the principal CPU (SV-M) has illustratively been changed. Thus the principal CPU (SV-M) is restarted by use of the program file held in the standby area of the NVM 14. In step 33, the principal CPU 11 supplies each CPU 11 with a message (e.g., START-VERS) ordering the latter to restart using the program file retained in the active area of the corresponding NVM 14. In response, the other CPU's 11 all restart in step 34 by use of their respective program files of the new version.

How a sequence sanity check is carried out on the new program version will now be described. Immediately after switching from the stanby area to the active area, two check points (1 and 2) are encountered in an initialization sequence executed by each CPU 11. When the network element 1 is started with the new version, each CPU 11 notifies the principal CPU 11 (SV-M in this example) of the CPU issue representing the currently executing program file.

The principal CPU 11 compares the CPU issue received from each CPU 11 with the corresponding one of the new version (i.e., the CPU issue set in the changed configuration file). In case of a match, the principal CPU 11 supplies each CPU 11 with an "OK" response. Given the response, each CPU 11 writes to a predetermined RAM area an ASCII code (code A, such as 0x4348454342B2D31) indicating a transit through check point 1 and continues with the sequence. In case of a mismatch (NG) in the above comparison, the principal CPU 11 halts the subsequent sequence. Following a last sequence complete message, all CPU's 11 write to their respective RAM areas an ASCII code (code B, such as 0x434845434B2D32) denoting a transit through check point 2.

After starting with the new program version, a soft download kernel unit in charge of controlling switching between the active and the standby area checks the respective RAM areas cyclically (e.g., up to 20 times in every 10 seconds). On verifying the codes A and B, the soft download kernel unit recognizes the completion of startup with the new program version. If the maximum number of cyclical checks fail to detect codes A and B, the system is restarted with the previous program version. In this manner, if a faulty sequence occurs in any CPU 11 after switching to the new program version, the previous program version may be resorted to, whereby the reliability of the communication system is improved.

With the above-described embodiment of the invention, managing a single generic issue for each network element 1 permits management of the program file version for each of a plurality of CPU's 11 configured in the network element in question. The scheme facilitates program version management of the system and makes it unnecessary for users to remain aware of program compatibility. Transferring a configuration file makes it possible not only to check for any program file degradation that may have occurred during the transfer but also to verify whether the correct program file has been transferred.

Immediately before starting with the new program version, checks are made to see if the program file to be executed by each CPU 11 is free of degradation. With the checks thus carried out, the entire communication system is restarted unfailingly with the new program version, so that the reliability of the system is boosted. In addition, during program file or configuration file transfers, the file is checked a plurality of times for any degradation. Such verification enhances the reliability of the communication system and ensures quick isolation of any faulty part in case of a file degradation. An immediate report of an error, if any, to the monitoring apparatus 2 makes it possible quickly to retransfer the necessary file for highly efficient file installation work.

Figure 10:
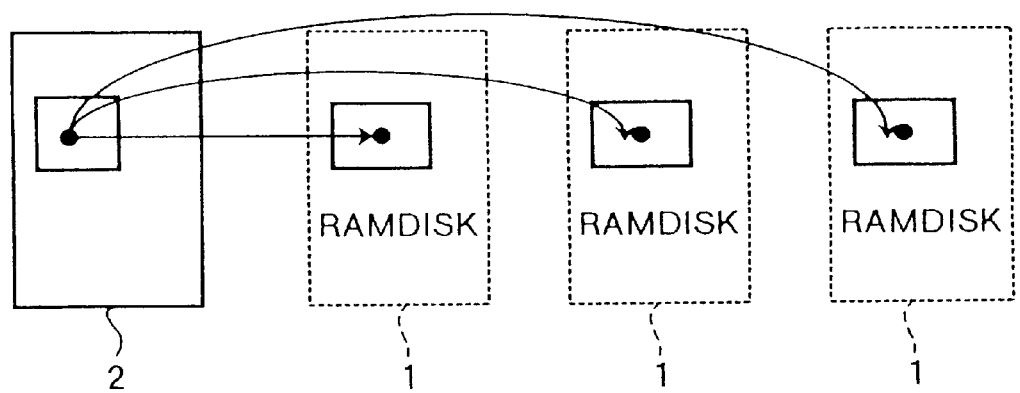
FIG. 10 is a schematic view outlining one scheme used by the embodiment to transfer data.
Figure 11:
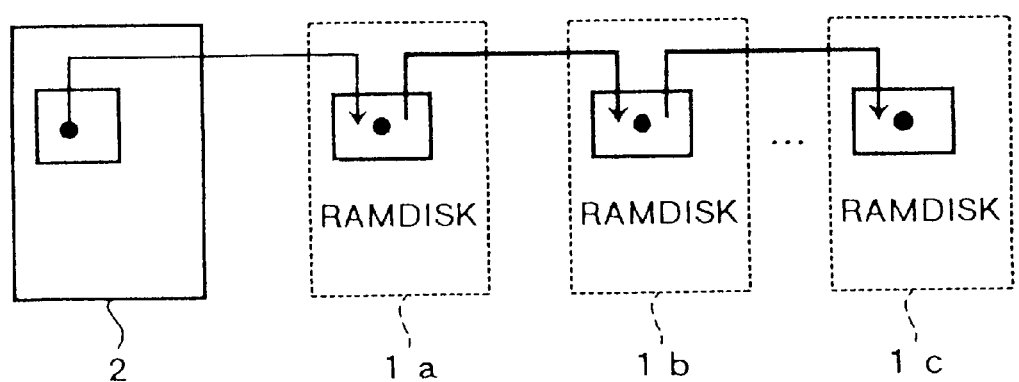
FIG. 11 is a schematic view sketching another scheme used by the embodiment to transfer data.

The above-described embodiment adopts, as shown in FIG. 10, a transfer scheme in which download data is transferred from the monitoring apparatus 2 individually to each of the network elements 1 configured. Alternatively, as depicted in FIG. 11, the embodiment may utilize a transfer scheme in which the monitoring apparatus 2 transfers download data to a network element 1a which in turn forwards the download data to another network element 1b which in turn passes the download data on to another network element 1c, and so on.

In the alternative case above, all inventive techniques still apply if the monitoring apparatus of the initial embodiment is read in the description as a network element transmitting download data, and each network element of the initial embodiment is read as a network element receiving the transferred download data.

One advantage of the communication system according to the invention is that version management of the programs transferred from the monitoring apparatus to network elements is facilitated so that functionally incompatible programs will not be transferred in combination. Another advantage of the communication system of the invention is that any invalid program is prevented from getting transferred from the monitoring apparatus to any network element. A further advantage is that the programs running in the communication system remain free of destruction or degradation, whereby the reliability of the system is enhanced.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A communication system comprising a plurality of network elements and a monitoring apparatus connected to said network elements via communication lines for centralized monitoring and control of said network elements;

wherein each of said network elements comprises:

a plurality of central processing units; and first storage means for storing programs to be executed by said central processing units; and wherein said monitoring apparatus comprises;

second storage means for storing a plurality of programs as files for each of said central processing units;

third storage means for storing generic issues representing versions of the programs for said central processing units in each of said network elements, said versions being called CPU issues, said generic issues being uniquely defined corresponding to combinations of said CPU issues;

management means for selecting programs to be transferred to said network elements on the basis of said generic issues stored in said third storage means when the versions of the programs for said central processing units in each of said network elements are changed; and first transfer means for retrieving from said second storage means the program files selected by said management means, generating download data in which said program files are set, and transferring said download data to each of said network elements, wherein said first transfer means compresses said download data in accordance with predetermined compression rules before transferring the compressed data.

2. A communication system according to claim 1, wherein said third storage means stores configuration files corresponding to said network elements on a one-to-one basis;

wherein said generic issues and said CPU issues corresponding to said generic issues are included as data in said configuration files; and wherein said configuration files further include file names of the program files corresponding to said CPU issues, sizes of said program files, and first checksum values which are theoretical checksum values of said program files.

3. A communication system according to claim 2, wherein, when the versions of any of the programs executed by each of said central processing units in each of said network elements are changed, said management means receives from said network elements the CPU issues of the programs currently executed by said central processing units of said network elements, compares the received CPU issues with the CPU issues set in the configuration files after the versions of any of said programs for said network elements have been changed, selects the programs of which the CPU issues are found to have been changed, and transfers the changed programs to said network elements.

4. A communication system according to claim 2, wherein said first transfer means sets parameters in transfer commands and sends said transfer commands to each of said network elements thereby instructing said network elements to start transferring said download data, said parameters being composed of said first checksum values corresponding to the programs files which are set in said configuration files and which are to be transferred.

5. A communication system according to claim 4, wherein each of said network elements comprises check means for acquiring second checksum values by calculating the checksum values of the transferred program files, comparing said second checksum values with said first checksum values set in said transfer commands, and detecting an error if a mismatch results from the comparison.

6. A communication system according to claim 5, wherein, if an error is detected, said check means sends an error message indicating a transfer error to said monitoring apparatus and discards the transferred program file corresponding to said transfer error.

7. A communication system according to claim 6, wherein each of said network elements comprises second transfer means for transferring the program files received from said monitoring apparatus to another network element adjacent to the network element in question.

8. A communication system according to claim 2, wherein said monitoring apparatus further comprises fourth storage means for storing theoretical third checksum values regarding said configuration files; and wherein said first transfer means transfers said configuration files and said third checksum values to each of said network elements.

9. A communication system according to claim 8, wherein, before the transfer of said download data is started, said first transfer means sets parameters in transfer commands and sends said transfer commands to each of said network elements thereby instructing said network elements to start transferring said download data, said parameters being composed of said third checksum values regarding said configuration files.

10. A communication system according to claim 9, wherein each of said network elements comprises check means for acquiring fourth checksum values by calculating the checksum values of the transferred configuration files, comparing said fourth checksum values with said third checksum values set in said transfer commands, and detecting an error if a mismatch results from the comparison.

11. A communication system according to claim 10, wherein, if an error is detected, said check means sends an error message indicating a transfer error to said monitoring apparatus and discards the transferred configuration file corresponding to said transfer error.

12. A communication system according to claim 11, wherein each of said network elements comprises second transfer means for transferring the configuration files received from said monitoring apparatus to another network element adjacent to the network element in question.

13. A communication system according to claim 8, wherein each of said network elements further comprises fifth storage means for storing said configuration files.

14. A communication system according to claim 13, wherein said fifth storage means has a plurality of storage areas capable of retaining a plurality of configuration files; and wherein each of said network elements copies the transferred configuration files a plurality of times to different storage areas of said fifth storage means.

15. A communication system according to claim 14, wherein each of said network elements randomly selects a plurality of configuration files from said storage areas of said fifth storage means, and determines as a valid configuration file one of a plurality of configuration files which constitute a majority of the selected configuration files and which have the same contents.

16. A communication system according to claim 15, wherein each of said network elements copies in overwriting fashion the contents of said valid configuration file to those storage areas of said fifth storage means which retain the configuration files different in contents from said valid configuration file.

17. A communication system according to claim 1, wherein said first checksum values included in said configuration files comprise checksum values in effect before and after the compression.

18. A communication system according to claim 1, wherein each of said network elements further comprises:

sixth storage means including an active area and a standby area, said active area accommodating the transferred program files; and decompression means for decompressing the transferred download data and for storing the program files set in said download data into said standby area of said sixth storage means.

19. A communication system according to claim 18, wherein each of said network elements further comprises time setting means for setting a time at which said active area and said standby area are switched;

wherein said first transfer means sets parameters in transfer commands and sends said transfer commands to each of said network elements thereby instructing said network elements to start transferring said download data, said parameters being composed of said first checksum values corresponding to the programs files which are set in said configuration files and which are to be transferred; and wherein said time setting means acquires, at the set time, fifth checksum values by calculating the checksum values of the program files held in said standby area, comparing said fifth checksum values with said first checksum values, sending an error message to said monitoring apparatus without carrying out the switching if at least one of the compared checksum values fails to match, and carrying out said switching if all compared checksum values match.

20. A communication system according to claim 19, wherein each of said network elements further comprises:

a soft download kernel unit for supervising control of the switching from said active area to said standby area; and seventh storage means corresponding to each of said central processing units;

wherein an initial sequence executed by each of said central processing units immediately after said switching from said active area to said standby area includes a plurality of check points;

wherein, every time any one of said central processing units verifies a transit through any one of said check points, the central processing unit in question writes to said seventh storage means a code indicating said transit; and wherein said soft download kernel unit checks cyclically for the code written to said seventh storage means and switches again said active area and said standby area if not all codes are verified after the code check has been carried out a predetermined number of times.

\* \* \* \* \*